BLOCK IDENTIFYING MARKER SYSTEM

Filed Jan. 26, 1955 2 Sheets-Sheet 1

INVENTOR,
DANIEL L. CURTIS
BY Henry Heyman
ATTORNEY

INVENTOR,
DANIEL L. CURTIS
BY Henry Heyman
ATTORNEY

United States Patent Office 2,923,589

Patented Feb. 2, 1960

2,923,589

BLOCK IDENTIFYING MARKER SYSTEM

Daniel L. Curtis, Manhattan Beach, Calif., assignor to Hughes Aircraft Company, a corporation of Delaware Application January 26, 1955, Serial No. 484,221

7 Claims. (Cl. 346—74)

This invention relates generally to information storage in electronic digital computers and more particularly to a method of and apparatus for marking the beginnings of information blocks on a magnetic storage medium.

Various types of data handling devices make use of a data storage medium to store certain information which will be periodically required. To give this system the greatest flexibility, however, such a storage medium is usually made alterable, i.e., information is recorded thereon and then erased in whole or in part. A medium such as tape coated with a magnetizable material lends itself very well to such a purpose. Information is recorded by inducing various states of magnetization in discrete portions of the magnetic coating. Such states of magnetization when arranged in a pattern, serve as a semi-permanent data storage for a data handling system such as a digital computer. The information will be retained by the magnetic coating until it is placed in a magnetic field which will either rearrange or erase previously recorded information.

In many computers the magnetic coating is placed upon a flexible tape or a solid drum. Data to be stored is often recorded in the form of blocks of words, as defined in an article entitled, "Standards on Electronic Computers: Definition of Terms, 1950" in "Proceedings of the IRE," for March 1951, pages 271 through 277 inclusive. These words consist of information pulses which are represented by various arrangements of the dipoles of the magnetic coating. One system for recording information involves the use of three magnetization states. The present invention may be advantageously utilized with such a system although its application is clearly not limited to the same. The description to follow, however, will place primary emphasis upon its use in conjunction with such a system.

In such three-state information system, the storage tape may have its dipoles in one of three states consisting of: saturation of the dipoles of a discrete portion of the magnetic coating in one direction, saturation of the dipoles of a discrete portion in the opposite direction, and the absence of oriented saturation of the dipoles of the coating. Saturation in one direction, e.g., from left to right, is arbitrarily referred to as a positive dipole arrangement and arbitrarily denotes a 1 in the binary number system. Saturation in the opposite direction, i.e., from right to left, will denote a 0 in the binary number system. The absence of oriented saturation of the dipoles, that is, a disordered orientation indicates lack of information, and is alternately referred to as "A.C. erased." A.C. erasure is effected by subjecting the magnetic tape to a varying magnetic field by placing the tape in motion relative to such varying field at a speed such that any discrete portion of the tape, as it moves through the varying magnetic field, will not remain in such magnetic field for a period long enough to allow its dipoles to become oriented in any predetermined arrangement. An A.C. erased condition can also be achieved by recording in such a manner that a dipole density per linear inch is produced which is higher than the reading head can resolve.

In one type of computer system, information is recorded in blocks of words which might correspond to the information transcribed on a standard punched card. A space is provided between blocks of words. This spacing between word blocks is necessary to allow the tape time to start and stop while the read-record head is over a portion of the tape that contains no useful information.

The reading or recording of information on a magnetic tape must be done at a predetermined speed depending upon the design of the computer system. For example, should the computer be designed to record information while the tape moves past the record head at 30" per second, it is apparent that in order to read this information at some later time the tape need be driven past the read head at the same speed of 30" per second. Therefore, in order for the head to properly read or record information, the tape must be travelling relative to such head at the correct speed, i.e., 30" per second. Due to the inertia of the tape, and/or the tape reel on which the tape is stored, some time, of necessity, is required before the tape can be brought up to synchronous speed to allow for accurate recording or reading of information.

Another reason for providing spaces between information blocks is to include information storage flexibility in the computer. Often it is desirable to either add to, or erase from, particular information blocks. In order not to have any information block to which information has been added and which therefore becomes elongated extend into a succeeding information block, such spaces are conventionaly provided.

Some means must be provided on the tape so that the beginning of a block of words can be recognized by the processor using the computer in order to tell him when to look at the outputs of the tape reading flip-flops which may be defined as bistable electronic devices. Some indication as to the beginning of an old information block, whose storage is no longer required, need be known so that the computer processor will know when to start erasing and recording over such old block. Several means have been employed in the past to indicate the beginning of a block of information to make it recognizable by the computer processor. All such means involve the use of some identifying mark on the tape to indicate the beginning of a block of words. Among the indentifying marks presently used in the computer art are: the punching of a hole in the tape, or the painting of a line upon the tape at the desired point which could be read photo-electrically. These methods have some obvious inherent limitations, the chief one being the inflexibility imposed upon the storage system. Another rather serious limitation imposed by the use of such a physical marking means is the need for the provision of some system not otherwise required for the computer to impress such identifying marks. Often times, as previously indicated, information blocks may have information added to or subtracted therefrom, making it desirable to change the beginning mark locations or other information blocks succeeding the changed block.

Similarly, it may become necessary to erase old information blocks and place on the tape new information blocks of either the same length or varying lengths, or at least of different sizes, having beginning locations necessarily different from those formerly contained on the storage tape. It has been found that a considerable saving in time could be obtained if the length of a block on the tape could be varied at will by the computer programmer. A mark must therefore be provided on the tape which mark can have its location changed at will to indicate the beginning of an information block and which can be recognized by the processer using the computer.

One method of indicating the beginning of an information block that lends itself to marking variable block lengths is to make provision for an extra channel on the recording tape and magnetically record thereon an information pulse which will indicate the beginning of a block; the useful information being contained in other parallel channels on the storage tape. The three-state magnetization system hereinbefore described conveniently lends itself to this flexible block marking indicating system. A dipole saturation in one direction may be arbitrarily designated as the indicator marker for the beginning of an information block, i.e., a binary 1. A binary 0, or dipole arrangement in the opposite direction may then be reserved to indicate the beginning of the last block of information and serves no other purpose on this block pulse channel on the storage tape.

The foregoing described block marking indicating system for recording new block lengths, having correspondingly new beginnings, on a tape that previously had information blocks recorded thereon of different lengths, as practiced at the present, involves the initial AC erasure of the entire block pulse channel by passing the channel of the tape past an erase head. According to this practice the tape has then to be rewound in the opposite direction in order to allow for the recordation of the new block markers on the block pulse channel as the tape is then again fed through the computer in the usual read-record direction.

It would be desirable to provide a system which will effectively serve to reduce what is thus presently a two-step operation to a one-step operation.

Thus an object of the present invention is to provide an alterable block-pulse blocking method to indicate the beginnings of information blocks recorded on a magnetic storage medium.

Another object of this invention is to provide a method of altering the block pulse mark pattern by a one-step continuous operation.

Another object of this invention is to provide a method of selectively erasing or recording block pulses on the block pulse channel of a magnetic tape to indicate the beginnings of information blocks disposed in other channels of the tape.

A still further object of the invention is to provide a system for producing alterable magnetic block pulse markers for indicating the beginnings of information blocks recorded on a magnetic tape which will permit altering of the location of the block pulses in conformity with any change in the locations of the information blocks, in one continuous operation.

In accordance with the present invention, there is provided means for selectively recording or erasing identifying marks to indicate the beginnings of information blocks previously recorded on a magnetic storage tape. This is accomplished by providing a block pulse channel which may have recorded thereon binary 1's coincident with the beginnings of information blocks disposed in other channels of the magnetic tape. The erasing and recording is accomplished in one continuous operation. The method of the present invention involves the steps of recording binary 1's in the block pulse channel by impressing on the magnetic read-record head a fixed state signal at a time when the information block disposed in the other channels begins coincident with the portion of the block pulse channel disposed under the block pulse magnetic read-record head, and selectively impressing an AC erase magnetic field at all other times causing the AC erasure of previously recorded information block markers.

The novel features which are believed to be characteristic of the invention both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purposes of illustration and example only, and are not intended as a definition of the limits of the invention.

Figures 1, 4:
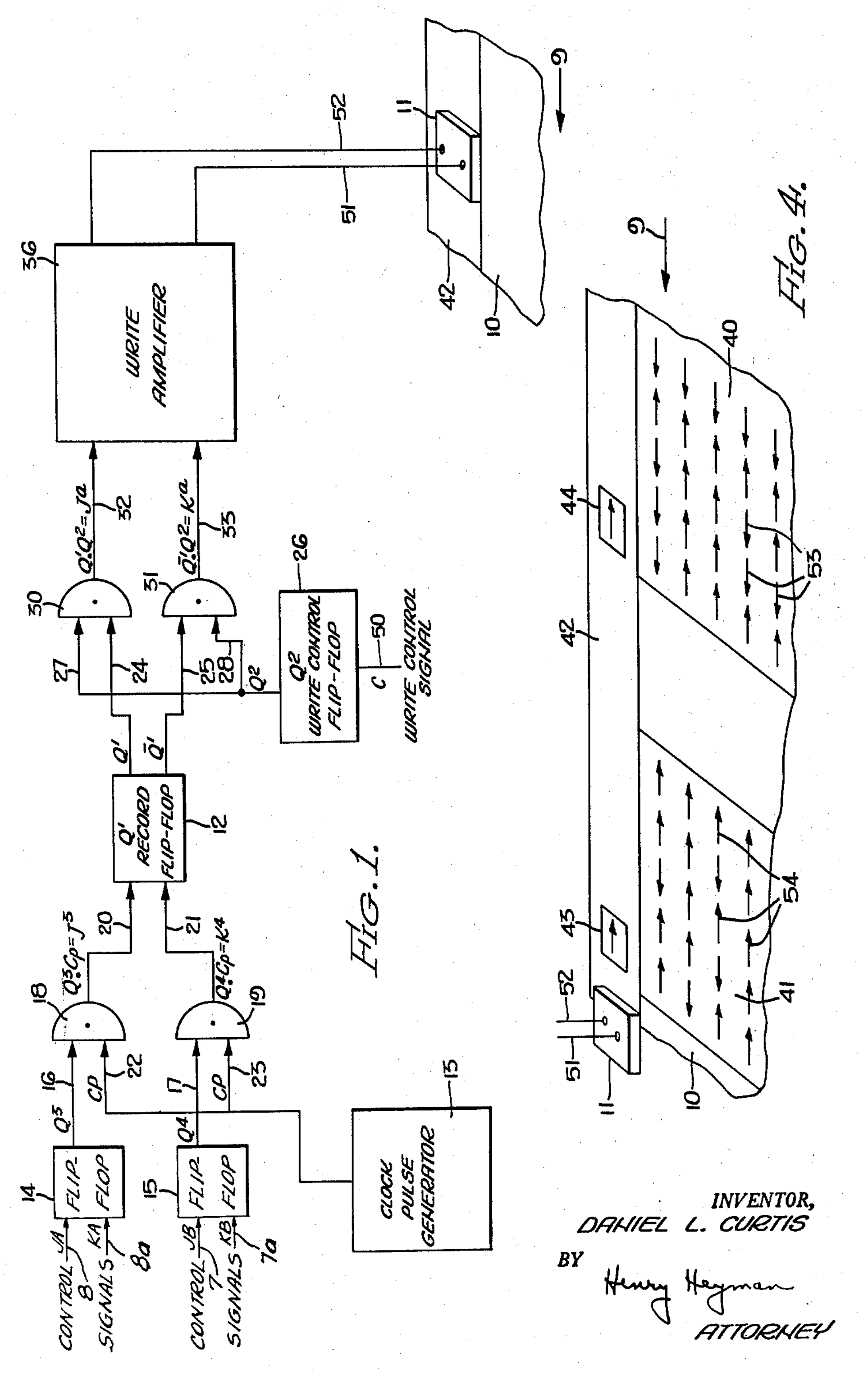
Fig. 1 is a block diagram of a system for recording an erasing information on a magnetic tape in accordance with the invention.
Fig. 4 is a view in perspective of a portion of a magnetic tape and with an associated record head and illustrates schematically the dipole arrangement of the block pulse marks with respect to the information channels recorded on the tape.

Referring now to the drawings, wherein like reference characters designate like parts throughout the various figures, there is shown in Fig. 1 one system for recording and erasing information on a magnetic tape employing the method of the invention. During a pulse marking or erasing operation a tape 10 is driven in the direction of arrow 9, i.e., from right to left by tape reel drives (not shown). A block pulse channel of tape 10, generally designated 42, is physically disposed in close proximity to a block pulse magnetic record head 11. The aim of the present invention is to selectively record and erase signals on block pulse channel 42 of tape 10. This is accomplished by continuously impressing selected electric signals upon head 11 in conformity with a predetermined pattern. The system shown in Fig. 1 provides these electrical signals, when required, by a method now to be explained.

A control flip-flop 14 has two output terminals, only one of which is here shown i.e. terminal 16. A signal having a relatively high voltage level appears when the flip-flop is in either its 1 or 0 state, at its appropriate output terminal. The signal appearing on each output terminal is of relatively low voltage level when the bistable element is not in the corresponding stable state. Control flip-flop 14 is responsive to an input or control signal JA as indicated which is impressed on input terminal 8 and which will always set control flip-flop 14 to a predetermined bistable state which may be designated as the 1 state. The other bistable input control signal KA which will contrariwise set control flip-flop 14 to its alternate bistable or 0 state, is also shown at 8A. A relatively high voltage (0 volts) appears at terminal 16 whenever control signal JA is impressed on terminal 8, and a relatively low voltage (−15 volts) appears at terminal 16 whenever control signal KA is impressed on terminal 8*a*. In accordance with well known practice, control flip-flop 14 may conveniently be a conventional Eccles-Jordan multivibrator. A control flip-flop 15 likewise will produce a relatively high voltage at its output terminal 17 whenever it receives a control signal JB at its input terminal 7, and a relatively low voltage at its output terminal 17 whenever it receives a control signal KB at its input terminal 7A. Just as in the case of control flip-flop 14, only one of the two output terminals is shown for control flip-flop 15.

The interconnection of control flip-flops 14 and 15 to provide the desired output signals from the control signals may be made most conveniently by means of logical "and" gates 18 and 19, in accordance with the logical Boolean equations, $$J^3 = Q^3.Cp \quad (1)$$

$$K^4 = Q^4.Cp \quad (2)$$

where the right hand member of each equation defines the conditions under which an input signal is applied to the flip-flop 12 input terminals specified by the left hand member of the equation, the indicated mathematical operations being logical, the "." signal representing the logical "and" connection and the symbols $Cp$ representing synchronizing or clock pulses. Clock pulse generator 13 produces these synchronizing or clock pulses $Cp$ at the input terminals 22 and 23 of "and" gates 18 and 19. The definition of an "and" gate may be found in "Proceedings of the IRE," cited above. The output terminals of "and" gates 18 and 19 are coupled to the input circuits of a record flip-flop circuit 12 which may also be a conventional Eccles-Jordan multivibrator. Gate 18 will only produce an output signal $J^3$ and impress it upon record flip-flop 12 when it simultaneously receives a clock pulse $Cp$ from the clock pulse generator 13 and a relatively high voltage $Q^3$ at terminal 16 from control flip-flop 14. Likewise, "and" gate 19 will only provide an output signal $K^4$ and apply it to input terminal 21 of record flip-flop 12 when it simultaneously receives a clock pulse from clock pulse generator 13 and a relatively high voltage $Q^4$ from control flip-flop 15. Record flip-flop 12 has two output signals, $Q^1$ and $\bar{Q}^1$, which are respectively set to alternate states by input signals $J^3$ and $K^4$, respectively. Signal $J^3$ appears at input terminal 20 of record flip-flop 12 whenever "and" gate 18 produces an output. Likewise, signal $K^4$ appears at input terminal 21 of record flip-flop 12 whenever "and" gate 19 produces an output signal.

In another embodiment of this invention (not shown), flip-flop 12 is an astable type electronic device. That is to say, it will oscillate between two stable states whenever its two input terminals simultaneously receive a 0 volt signal. Should either input signal fall substantially below 0 volts for any period of time, the oscillations will cease. The outputs of the astable device will then each be clamped at the two opposite voltage amplitude extremes of the range over which the oscillations ordinarily take place where the boundary conditions for oscillation have been met. In this second embodiment the gates 18 and 19 and the clock pulse generator 13 are not necessary. The output flip-flop 14 ($Q^3$) is connected directly to the input terminal 20 of the flip-flop 12 and the output of flip-flop 15 ($Q^4$) is connected directly to the input terminal 21 of the flip-flop 12. Such a circuit is shown on page 172, vol. 19, Waveforms, Radiation Laboratory Series, McGraw-Hill, New York, 1949, in Figs. 5–16, in which input terminals 20 and 21 would be connected to the grids of tubes V1 and V2.

A write control flip-flop 26 has output leads 27 and 28 coupled to "and" gates 30 and 31, respectively. The output signals which appear at terminals 27 and 28 of control flip-flop 26 are designated as $Q^2$. Write control flip-flop 26 which is a conventional Eccles-Jordan circuit, has both its input terminals connected together forming a single input terminal 50. Such a flip-flop will change state each time a pulse is applied to its input terminal. Thus a first input pulse will produce a relatively high voltage (0 volts) on output leads 27 and 28. The next input pulse will produce a relatively low voltage (−15 volts) on output leads 27 and 28.

"And" gate 30 has its input terminals 24 and 27 respectively coupled to the outputs of control flip-flop 26 represented by signal $Q^2$ and of record flip-flop 12 represented by signal $Q^1$. Thus "and" gate 30 will present a signal $J^a$ at its output terminal 32 whenever it simultaneously receives signals $Q^1$ and $Q^2$ at its input terminals 24 and 27. Similarly "and" gate 31 is coupled to write control flip-flop 26 and record flip-flop 12 by leads 28 and 25. "And" gate 31 will only present an output signal $K^a$ at its terminal 33 whenever it simultaneously receives input signals $\bar{Q}^1$ and $\bar{Q}^2$. The two output signals $J^a$ and $K^a$ are amplified by write amplifier 36 which has its output terminals 51 and 52 coupled to magnetic record head 11.

Figure 3:
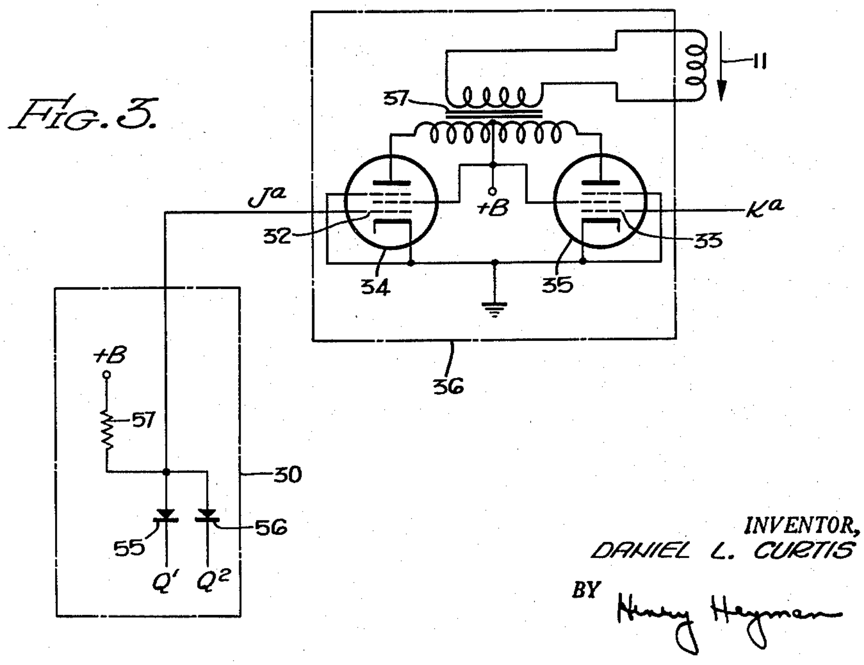
Fig. 3 is a circuit diagram of one embodiment of a write amplifier together with an "and" gate forming part of the system of Fig. 1.

The circuit diagram of Fig. 3 will now be explained. As was previously indicated, Fig. 3 is a circuit diagram of "and" gate 30 and write amplifier 36 forming part of the system of Fig. 1. "And" gate 30 impresses the signal $J^a$ on the grid 32 of tube 34. Similarly "and" gate 31, not shown in Fig. 3, impresses the signal $K^a$ on grid 33 of tube 35. "And" gate 30 is designed to develop signal $J^a$ whenever it receives signals $Q^1$ and $Q^2$ at its respective diodes 55 and 56. In this circuit the diodes 55 and 56 are poled in such a manner that the output lead going to grid 32 of tube 34 can never assume a potential appreciably above that of the least positive input lead. Both diodes 55 and 56 are connected to a source of positive potential indicated by B+ through resistor 57. It will readily be seen that the simultaneous receipt of both signals $Q^1$ and $Q^2$ at "and" gate 30 is thus necessary in order for signal $J^a$ to be impressed on the grid 32 of tube 34. The plate circuits of tubes 34 and 35 are coupled through transformer 37 to magnetic record head 11.

Reference is now made to Fig. 4 in order to better understand the present invention. As indicated by arrow 9 the tape 10 is moving from right to left with respect to block pulse channel magnetic record head 11. Block pulse channel 42 will always be physically disposed in close proximity to head 11 so that the head can record the required block identifying pulses on the block pulse channel. Two adjacent information blocks are indicated at 40 and 41 which have previously been recorded in the other channels of magnetic tape 10. The information in blocks 40 and 41 is represented by arrows 53 and 54 pointing from right to left and left to right, respectively, wherein arrows 54 represent a recorded 1 in the binary system while arrows 53 represent a binary 0. Assuming that the binary 1's disposed in the block pulse channel at the beginnings of blocks 40 and 41, represented by arrows 43 and 44 each disposed in a rectangle, respectively, had not previously been recorded, the recording of such pulses by the present invention will now be explained. Certain assumptions will be made with respect to the operating components making up the block pulse marking system of the present invention as included in the system shown in Fig. 1.

Figure 2:
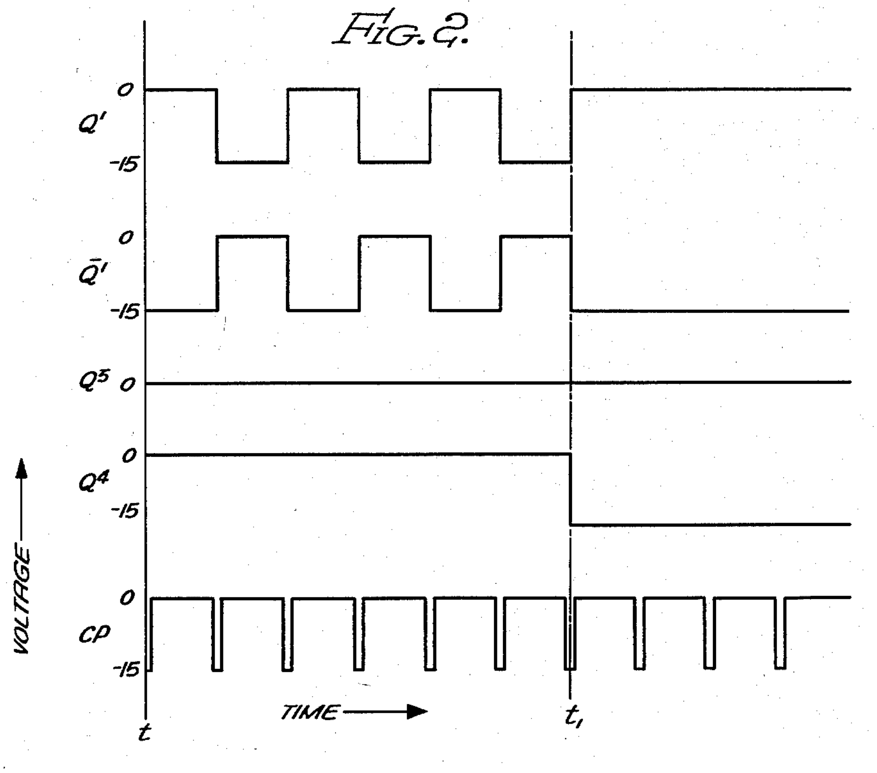
Fig. 2 is a graph showing, as a function of time, voltages developed by various flip-flops, and by a clock pulse generator included in the system of Fig. 1.

First assume that the clock pulse generator 13 is producing negative pulses of one-half microsecond duration at the pulse repetition rate of approximately 160 kc. and having an amplitude of −15 volts. A further assumption will be made that the output signals $Q^3$ and $Q^4$ of each of the two states of control flip-flops 14 and 15 are either at 0 or −15 volts, as may be best seen in Fig. 2. Signal $Q^3$ as shown in Fig. 2 remains at 0 volts continuously and signal $Q^4$ is shown as being at 0 volts and then dropping to −15 volts at time $t_1$. Since the normal flip-flop changes state at a voltage drop on the appropriate input lead, each fall of the $Cp$ signal, being applied to both inputs of flip-flop 12, will change the state of the flip-flop. When this situation obtains, the outputs $Q^1$ and $\bar{Q}^1$ at leads 24 and 25 from the record flip-flop 12 will produce an 80 kc. square wave of 15 volts amplitude.

If signal C is now impressed on input lead 50 of write control flip-flop 26 a relatively high voltage will be produced at the respective output leads 27 and 28 of flip-flop 26. This will effectively allow "and" gates 30 and 31 to produce respective output signals $J^a$ and $K^a$ at output leads 32 and 33 in accordance with the input signals $Q^1$ and $\bar{Q}^1$ developed as the output of record flip-flop 12.

One operation of recording marker pulses 43 and 44 to mark the beginnings of information blocks 40 and 41 on tape 10 will now be elucidated. As was previously assumed block pulses 43 and 44 are not yet recorded on the tape on the block pulse channel 42. The programmer, having recorded blocks 40 and 41, is aware of their respective locations on the tape and accordingly programs the computer so that it will control flip-flops 14 and 15 to properly provide signals to produce the desired block pulses to mark the beginnings of information blocks 40 and 41. At all times when control flip-flops 14 and 15 have their output levels at 0 volts, respectively (from time $t$ through $t_1$ as shown on Fig. 2), gates 18 and 19 will simultaneously impress their output signals through leads 20 and 21 on record flip-flop 12. As previously explained, this will produce on 80 kc. square wave at each output lead 24 and 25 of record flip-flop 12. As was previously assumed control flip-flop 26 will allow the output signals $Q^1$ and $\bar{Q}^1$ of record flip-flop 12 to be impressed through gates 30 and 31 to amplifier 36 which, in turn, impresses the amplified signals across record head 11. This rapidly varying write signal produces a correspondingly rapidly fluctuating magnetic field at the head 11.

As the block pulse channel 42 moves past head 11, the dipoles in the magnetic coating, will not be able to align themselves with the lines of force created by the rapidly fluctuating magnetic field. In addition, since a reading head placed on the track 42 would view one discrete cell at a time, and since each cell is approximately 7 mils in length, such a head could not resolve the extremely small cells produced by the 80 kc. recording—since these cells would have a length of approximately 0.6 mil. The arrows 53 and 54 in information blocks 40 and 41 shown in Fig. 4 are representative of aligned dipoles, representing binary 0's and 1's, respectively, in discrete portions of the information channels of the information blocks; the dipole arrangements for marking the beginnings of block pulses in the block pulse channel being similarly so represented by arrows. Thus, the dipole arrangement in the block pulse channel 42 will remain in its former state, i.e., AC erased.

On the other hand, should control signal KB be applied to the control flip-flop 15 to change its output signal $Q^4$ so as to fall to −15 volts at time $t_1$ (see Fig. 2), from 0 volts for approximately 75 microseconds, then record flip-flop 12 will no longer have a 0 voltage level impressed on both input leads 20 and 21. Of course signal $Q^3$ of flip-flop 14 will still be at 0 volts even beyond time $t_1$ (see Fig. 2). Thus, the "and" gate 19 will no longer pass clock pulses and flip-flop 12 will not be returned to the condition where the terminal $\bar{Q}^1$ has a relatively high voltage. However, the terminal 20 still receives clock pulses and hence the terminal $Q^1$ of flip-flop 12 will assume and retain a relatively high voltage state until a signal JB is received. Since terminals 27 and 28 of flip-flop 26 have assumed a relatively high voltage state, a relatively high voltage will exist at terminal $J^a$ of write amplifier 36 and a relatively low voltage will exist at terminal $K^a$ of write amplifier 36. This will cause tube 34 to conduct and cut off tube 35. Current will now flow from B+, through the tube 34 to ground. This will transmit a pulse through the transformer 37 to the head 11, causing the dipoles on the block pulse channel 42 then passing under the head 11 to orient themselves in accordance with the lines of force of the unidirectional magnetic field, thus recording a binary 1 in the block pulse channel therein referred to as 43 in Fig. 4. The oriented dipoles identified by arrow 43 indicate the beginning of block 41.

Between blocks 40 and 41 the magnetic field will again vary as control signal JB will be received at input terminal 7 of control flip-flop 15. Thus the signal being impressed by this varying magnetic field at head 11 will cause AC erasure on the block pulse channel from the end of arrow 43 to the beginning of information block 40.

When information block 40 appears under an information read head (not shown) the portion of the block pulse channel coincident with the beginning of information block 40 will be physically disposed in close proximity to block pulse channel magnetic record head 11. Again the respective control flip-flop 14 or 15 as controlled by signals KA or KB at input leads 8 or 7 will order either output signals $J^3$ or $K^4$ to go from 0 to −15 volts, thus again clamping the output signals $Q^1$ and $\bar{Q}^1$ of record flip-flop 12 as previously explained so that a marker bit will again be recorded, as indicated by arrow 44.

Thus we effectively have two outputs from write flip-flop 12; when both input signals are at 0 volts the square wave output is at a high frequency—and when either input signal falls substantially below 0 volts the output is clamped at a fixed state.

From the foregoing description, it should be clear that the recording of new block pulses is not dependent upon the prior state of the magnetic arrangement of the dipoles on the block pulse channel.

There has thus been disclosed a block pulse identifying system for and method of recording pulses to mark the beginnings of information blocks recorded on a magnetic tape and erasing old marking pulse by a one-step continuous operation.

What is claimed as new is:

1. A system for selectively recording or erasing magnetic information pulses on a block pulse channel on a magnetic storage medium to indicate the beginnings of information blocks disposed in at least one other channel of said magnetic storage medium, said system comprising: a magnetic record head and a magnetic storage medium disposed for relative movement, a bistable electronic device for selectively impressing on said head a first electric signal for recording an information pulse on said block pulse channel or a second electric signal for erasing previously recorded information pulses on said block pulse channel, said bistable electronic device having an output circuit coupled to said magnetic record head; and means coupled to said bistable device for selectively impressing thereon said first and second electric signals to control the output signal thereof.

2. The system defined in claim 1 wherein said means for impressing comprises second and third bistable electronic devices; a clock pulse generator for developing clock pulse signals; and first and second electronic "and" gating circuits, said first gating circuit being coupled to said clock pulse generator and to said second bistable device and adapted to provide an output signal only when a clock pulse signal and a signal from said second bistable electronic device are simultaneously received, and said second gating circuit being coupled to said clock pulse generator and to said third bistable electronic device and adapted to provide an output signal only when a clock pulse signal and a signal from said third bistable electronic device are simultaneously received, said first and second gating circuits being coupled to said first bistable device to impress their output signals thereon.

3. The system defined in claim 2 wherein said system further includes electronic means coupled to said record head for selectively isolating said record head from said block pulse channel, said electronic means for selectively isolating including a fourth bistable electronic device; third and fourth electronic "and" gating circuits coupled to said fourth bistable device, said third gating circuit being coupled to said first bistable device and adapted to provide a signal only when a signal from said first bistable electronic device and a signal from said fourth bistable electronic device are simultaneously received, and said fourth gating circuit being coupled to said first bistable electronic device and adapted to provide a signal only when a signal from said first bistable electronic device and a signal from said fourth bistable electronic device are simultaneously received; and an amplifier having input terminals coupled to said third and fourth gating circuits and output terminals coupled to said record head to amplify the output signals from said third and fourth gating circuits.

4. A system for selectively recording or erasing magnetic information pulses on a block pulse channel on a magnetic storage medium to indicate the beginnings of information blocks disposed in at least one other channel of said magnetic storage medium, said system comprising: a magnetic record head; a magnetic storage medium movable relative to said magnetic record head, said head being disposed contiguous to and fixed with respect to said magnetic storage medium; a first bistable electronic device for selectively impressing on said head a first electric signal for recording an information pulse on said block pulse channel or a second electric signal for erasing previously recorded information pulses on said block pulse channel, said first bistable device having an output circuit coupled to said magnetic record head; means coupled to said first bistable device for controlling the output signal thereof, said means for controlling the output signal comprising second and third bistable electronic devices, a clock pulse generator for developing clock pulse signals, first and second electronic "and" gating circuits, said first gating circuits being coupled to said clock pulse generator and to said second bistable device and adapted to provide an output signal only when a clock pulse signal and a signal from said second bistable electronic device are simultaneously received, and said second gating circuit being coupled to said clock pulse generator and to said third bistable electronic device and adapted to provide an output signal only when a clock pulse signal and a signal from said third bistable electronic device are simultaneously received, said first and second gating circuit having output terminals coupled to said first bistable device to impress their output signals thereon; means coupled to said record head for selectively isolating said record head from said block pulse channel, said means for selectively isolating including a fourth bistable electronic device, third and fourth electronic "and" gating circuits coupled to said fourth bistable device, said third gating circuit being coupled to said first bistable device and adapted to provide a signal only when a signal from said first bistable electronic device and a signal from said fourth bistable electronic device are simultaneously received, said fourth gating circuit being coupled to said first bistable electronic device and adapted to provide a signal only when a signal from said first bistable electronic device and a signal from said fourth bistable electronic device are simultaneously received; and an amplifier coupled between said third and fourth gating circuits and said record head to amplify the output signal from said third and fourth gating circuits.

5. Apparatus for selectively recording information on a magnetic storage medium, said apparatus comprising a recording head, a magnetic storage medium disposed for relative movement with respect to said heads, means for delivering electrical signals of alternate polarity to said recording head for recording on said medium at a rate beyond the capacity of said medium to record such signals, and control means for selecting a signal of one of said polarities and for changing the delivery rate of said signal to a rate within the capacity of said medium to record.

6. Apparatus for selectively recording information on a magnetic storage medium as defined in claim 5 wherein said control means comprises "logical" control means.

7. Apparatus for selectively recording and erasing information on a magnetizable storage medium, said apparatus comprising a recording head and a magnetizable storage medium disposed for relative movement, means for delivering electrical signals to said head at a rate to effectively erase information on said medium, and means for lowering the delivery rate of said electrical signals at predetermined intervals for recording information on said medium.

References Cited in the file of this patent

UNITED STATES PATENTS

| | | |
|---|---|---|
| 788,790 | Pedersen | May 2, 1905 |
| 2,629,784 | Daniels | Feb. 24, 1953 |
| 2,680,239 | Daniels et al. | June 1, 1954 |
| 2,721,990 | McNaney | Oct. 25, 1955 |
| 2,739,299 | Burkhart | Mar. 20, 1956 |

UNITED STATES PATENT OFFICE

CERTIFICATE OF CORRECTION

Patent No. 2,923,589 February 2, 1960

Daniel L. Curtis

It is hereby certified that error appears in the printed specification of the above numbered patent requiring correction and that the said Letters Patent should read as corrected below.

Column 2, line 57, for "or other" read -- of other --; column 7, line 5, for "produce on" read -- produce an --.

Signed and sealed this 23rd day of August 1960.

(SEAL)
Attest:

KARL H. AXLINE
Attesting Officer

ROBERT C. WATSON
Commissioner of Patents